United States Patent [19]

Tanaka

[11] Patent Number: 5,506,843
[45] Date of Patent: Apr. 9, 1996

[54] SUBSCRIBER GROUP DIGITAL TRANSMITTER

[75] Inventor: Kazuo Tanaka, Kawasaki, Japan

[73] Assignee: Fujitsu Limited, Kanagawa, Japan

[21] Appl. No.: 296,347

[22] Filed: Aug. 25, 1994

[30] Foreign Application Priority Data

Feb. 25, 1994 [JP] Japan .................................... 6-052959

[51] Int. Cl.[6] .............................. H04J 3/12; H04Q 11/08
[52] U.S. Cl. ...................... 370/68; 370/68.1; 370/110.1
[58] Field of Search ............................. 370/56, 68, 68.1, 370/110.1, 110.4, 111, 112; 379/333, 334, 335, 350, 353

[56] References Cited

U.S. PATENT DOCUMENTS 4,327,436  4/1982  Ohara et al. ........................ 370/110.1
4,520,477  5/1985  Wen ..................................... 370/110.1
5,144,624  9/1992  Sharper et al. ........................ 370/68.1

*Primary Examiner*—Hassan Kizou

[57] ABSTRACT

In a subscriber group digital transmitter, it becomes possible to recognize a position of signaling control monitoring signal accurately, when improving a TSI (Time Slot Interchange) function between a plural DS1 lines provided with a hybrid signaling system.

The transmitter comprising a TSI circuit for cross-connecting time slots of a receipt DS1 data detects a position of signaling control monitoring signal of the receipt DS1 data on the foregoing section of TSI circuit, transmit the position information to the latter section of TSI circuit, and recognizes a signaling control monitoring signal based on the position information.

9 Claims, 8 Drawing Sheets

Signaling Position Detecting Section 13

SUBSCRIBER GROUP DIGITAL TRANSMITTER

BACKGROUND OF THE INVENTION

1. Field of the Invention

The present invention relates to a subscriber group digital transmitter. More particularly, it relates to a subscriber group digital transmitter, which can recognize a location of a monitoring signal for signaling control when TSI (Time Slot Interchange) function is realized between a plurality of DS1 lines provided with a hybrid signaling system.

2. Related Prior Art

In a hybrid signaling system, a monitoring signal for signaling control (hereinafter referred as to signaling information) of a subscriber and the voice frequency signal (PCM) of the subscriber are transmitted on the same channel (a time slot).

Figure 8:
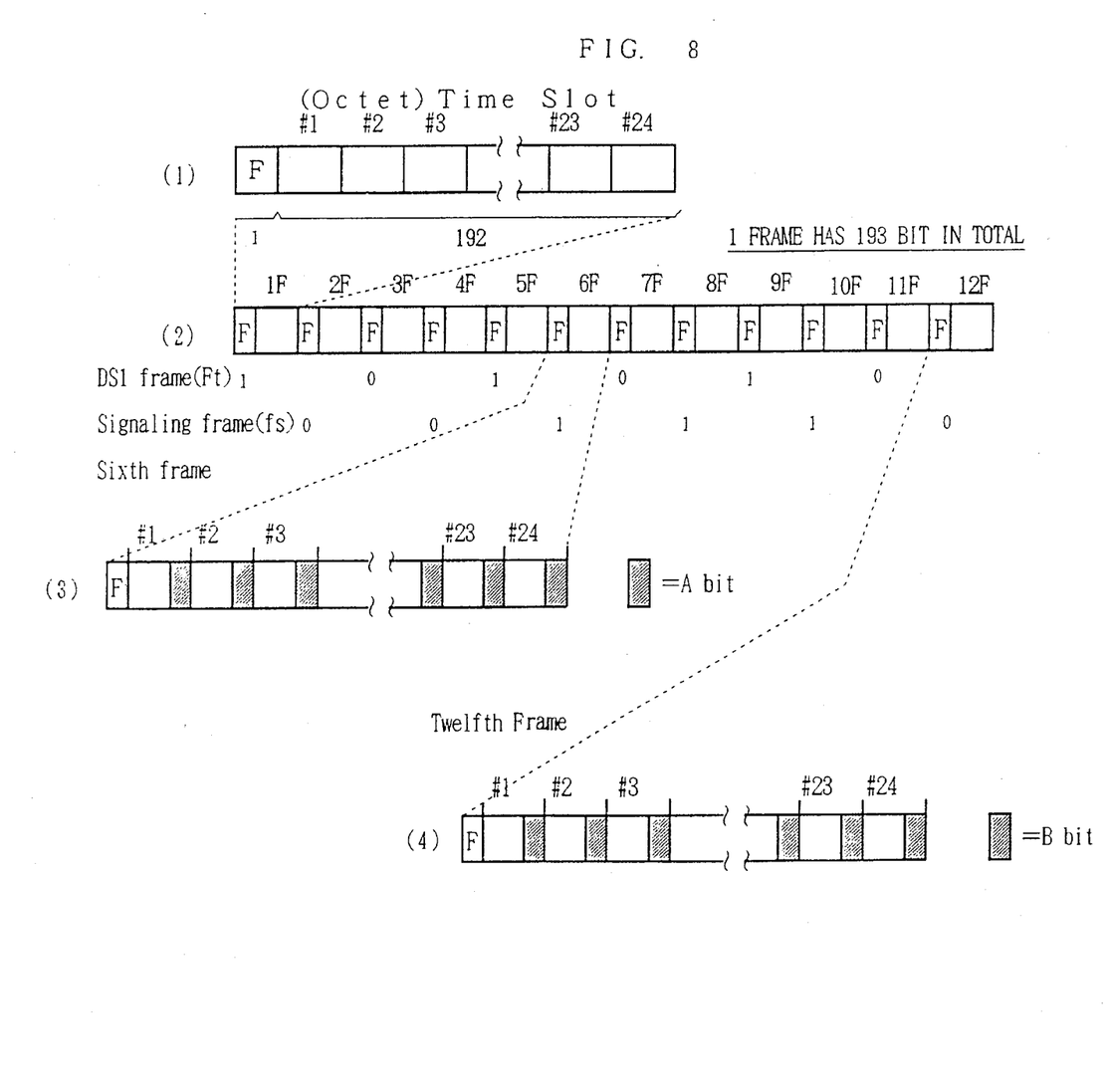
FIG. 8 is a diagram explaining the DS1 frame format.

FIG. 8 is a diagram explaining a frame format of DS (Digital Signal) 1. (1) of FIG. 8 shows an unit frame, which comprises time slots TS1 to TS24 required for 24 channels and frame bit "F" provided at the head of the time slots TS1 to TS24.

Each of time slots is composed of 8 bits. One sample value of the voice frequency signal of the subscriber is coded with 8 bits, so that one unit frame is composed of 193 bits. Further, a super frame shown in (2) of FIG. 8 is a multi frame composed by multi-linking the 12 unit frames.

The super frame has twelve F bits. The odd numbered frames of the twelve F bits are called DS1 frames and the even numbered frames are called as signaling frames. These signaling frames express inserting positions of A and B bits showing the subscriber line signaling information based on the North America Standard (for example, TR-008, TR-003).

That is, the signaling information which is a monitoring signal for signaling control is composed of A and B bits. A bits are inserted to LSBs of each time slot of the sixth frame, in which the signaling frames are converted from "0" to "1", and B bits are inserted to LSBs of each time slot of the twelfth frame, in which the signaling frames are converted from "1" to "0".

The A and B bits are inserted to the LSBs of each time slot of the sixth and twelfth frames, respectively, so that the voice frequency signal of the subscriber is coded with 7 bits by using a different coding rule from that in the time slots of other frames (as described above, it is coded with 8 bits in the time slots of other frames).

Figure 9:
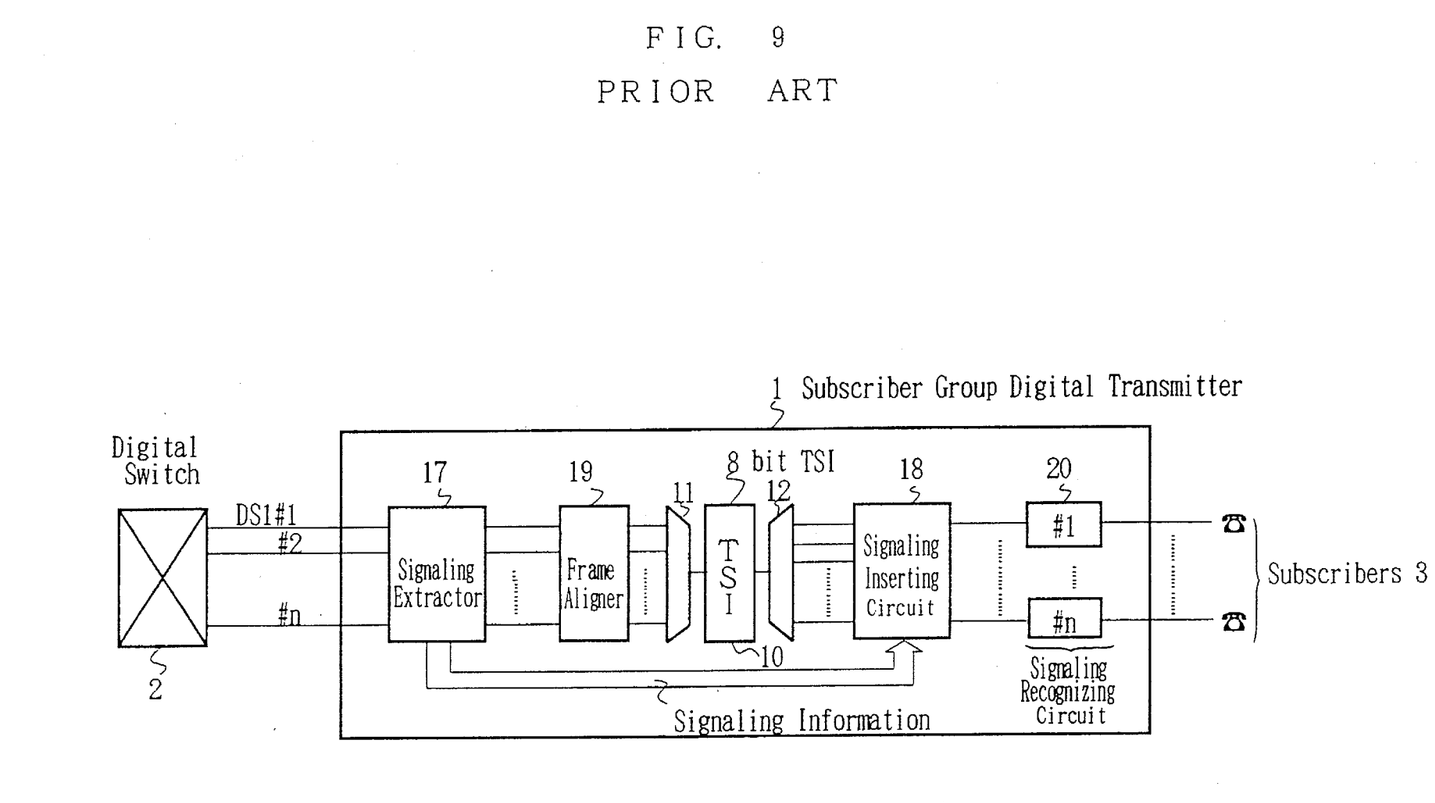
FIG. 9 is a diagram showing the conventional structure.

FIG. 9 is a block diagram showing the conventional structure of the subscriber group digital transmitter 1 which transmits to the plural subscribers 3, the digital signals corresponding the signaling information, and the voice frequency signals of the subscribers obtained by cross-connecting.

The digital signals have the above-described multi-frame structure, which are transmitted via the plural DS1 lines (#1 to #n) from the digital switch 2.

In the conventional subscriber group digital transmitter 1, a signaling information extractor 17 has a function for extracting the subscriber signaling information from the multi-frame signals transmitted via the plural DS1 lines (#1 to #n).

A frame aligner 19 has a function for aligning the frame phases (the phases of time slots) of the multi-frame signal after extracting the subscriber signaling information. The signals the frame phases of which are aligned are converted to serial data in a multiplexing/demultiplexing circuit 11, and inputted to a TSI circuit 10.

In the TSI circuit 10, the time slots for the voice frequency signal of the subscribers are cross-connected per 8 bits. The cross-connected signals are converted to parallel data in the multiplexing/demultiplexing circuit 12 and led to a signaling information inserting circuit 18. In the signaling information inserting circuit 18, the subscriber signaling information which is extracted in the signaling information extractor 17 is inserted to the cross-connected voice frequency signals of the subscribers, again.

Further, signaling information recognizing circuits (#1 to #n) 20 are provided corresponding to the plural subscribers 3.

The above-described conventional subscriber group digital transmitter 1 extracts a signaling information in the foregoing section of the TSI circuit 10, and inserts signaling information extracted again after having cross-connected the time slots in the TSI circuit 10. Accordingly, the structure of the conventional subscriber group digital transmitter 1 generates such a problem that the signaling information is inserted to the position which is not in the signaling frames (the sixth and the twelfth frames).

In the conventional transmitter, the frame phases (the phases of time slots) are aligned in the frame aligner 19, after the signaling information is extracted in the signaling extractor 17, and then the TSI processing is performed. However, the phase of the sixth frame period is not aligned, in the conventional transmitter.

Therefore, it becomes difficult to recognize the position of the signaling information, as it is not sure that the time slots which exist in the signaling frame before exist in the sixth frame after performed the TSI processing in the TSI circuit 10.

As the result, the signaling information is extracted in the foregoing section of the TSI circuit 10 and inserted with the six frames period. However, there is a case where the signaling information is inserted in the position which is not an accurate signaling frame. Then, it brings a problem that VF signal characteristics are deteriorated.

This is because the coded bit number of the voice frequency signal of the signaling frames is different from that of other frames, and it brings a problem that the VF signal characteristics are deteriorated, as the coded bit number of the inserted frames becomes smaller than 8 bits, when the signaling information is inserted to the frames other than the signaling frames.

SUMMARY OF THE INVENTION

Accordingly, it is an object of the present invention to provide a digital transmitter having a cross-connecting function, that is, a subscriber group digital transmitter, to overcome the shortcomings of the conventional transmitter.

A subscriber group digital transmitter according to the present invention comprises: a signaling position detecting section for receiving DS1 data transmitted via a plurality of DS1 lines and detecting a position of time slots of signaling information per a DS1 line; a signaling position transmitting section for transmitting the detected position of time slots of signaling information; a time slot interchange circuit for cross-connecting the time slots of DS1 data; and a signaling information recognizing section for extracting signaling information at the position of the corresponding time slots to that of signaling information transmitted from the signaling position information transmitting section to the DS1 data of which time slot is cross connected on the TSI circuit.

DETAILED DESCRIPTION OF THE PREFERRED EMBODIMENT

Throughout the following descriptions, the same reference numerals are used to denote and identify corresponding or identical components.

Figure 1:
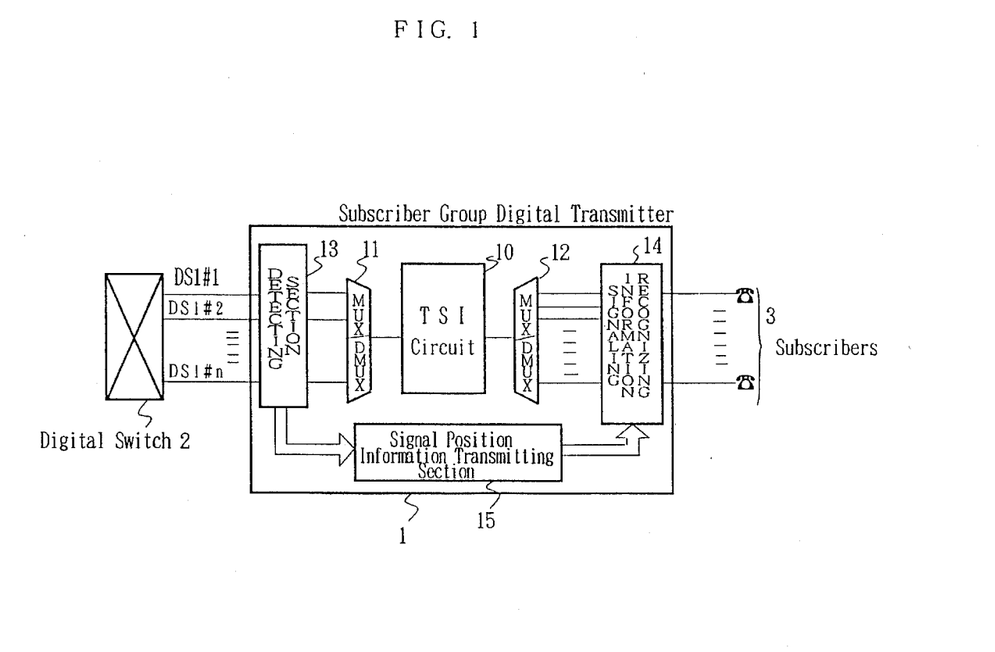
FIG. 1 is a block diagram showing the principle structure of the present invention.

FIG. 1 is a diagram explaining the principle structure of the present invention. Reference numeral "1" is a subscriber group digital transmitter according to the present invention. DS1 data transmitted from a digital switch 2 via a plurality of DS1 lines (#1 to #n) are transmitted to the subscriber group digital transmitter 1, similarly to the conventional transmitter shown in FIG. 9.

The outputs from the subscriber group digital transmitter 1 are concentrated and connected to the plural subscribers. The DS1 data has a frame format explained in connection with FIG. 8.

The subscriber group digital transmitter 1 according to the present invention has a signaling position detecting section 13 for detecting positions of time slots of signaling information per each of DS1 lines in the foregoing section of the TSI circuit 10. Further, the transmitter has a signaling position information transmitting section 15 for transmitting positions of the time slots of the detected signaling information to a signaling information recognizing section 14 in the latter section of the TSI circuit 10.

Signaling position information is inserted to the head of each time slot of the sixth frame which has a predetermined number of time slots, for example, signaling bits (A bits), as described latter, as additional bits, and transmitted via the TSI circuit 10 to the signaling information recognizing section 14.

The additional bit is made "1" as a signaling position information. Thus, it becomes possible to detect each time slot of the sixth frame by detecting this additional bit "1" in the signaling information recognizing section 14, even if the time slots are cross-connected in the TSI circuit 10.

More particularly, it becomes possible to detect the sixth frame in which there is a signaling bit (A bit) by detecting the time slot which has the head bit "1" in the signaling information recognizing section 14.

Further, it becomes possible to detect the twelfth frame in which there is a signaling bit (B bit). Furthermore, it becomes possible to detect the twelfth frame by counting the time slots required for 6 frames from the sixth frame.

Accordingly, the signaling bits (A bit and B bit) can be extracted.

Figure 2:
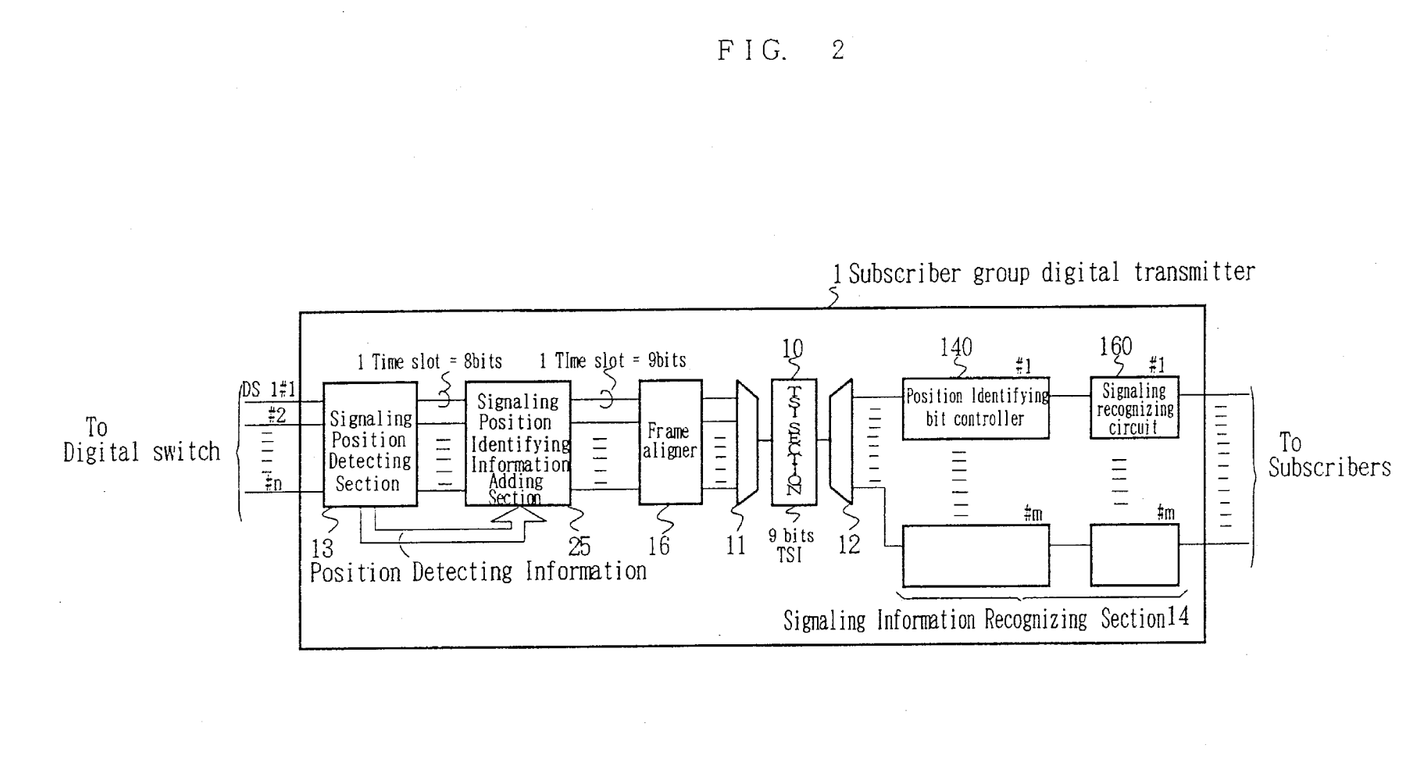
FIG. 2 is a block diagram showing an embodiment of the present invention.

FIG. 2 is a block diagram showing the embodiment of the digital transmitter 1 according to the present invention.

In FIG. 2, DS1 data is transmitted from the digital switch 2, not shown in the diagram, to the subscriber group digital transmitter 1 via a plurality of DS1 lines (#1 to #n), similarly to the conventional structure.

The outputs from the subscriber group digital transmitter 1 are concentrated and transmitted to the plural subscribers. The DS1 data having a frame format explained in connection with FIG. 8 is transmitted to the subscribers.

The subscriber group digital transmitter 1 has a signaling position detecting section 13 for detecting the positions of time slots of signaling information per each DS1 line, a position identifying bit adding section 25, a frame aligner 16 and a multiplexing/demultiplexing circuit 11 in the foregoing section of the TSI circuit 10.

Further, the transmitter 1 has a multiplexing/demultiplexing circuit 12 and a signaling information recognizing section 14. In the signaling information recognizing section 14, a plurality of position identifying bit controllers or monitors 140 (#1 to #m) and signaling recognizing circuits 160 (#1 to #m) are provided corresponding to the plural subscribers (#1 to #m).

The number of the plural subscribers (#1 to #m) are smaller than that of the time slots on the plural DS1 lines (#1 to #n). This is because data of the time slots on the plural DS1 lines are concentrated and transmitted to the plural subscribers (#1 to #m).

Figure 3:
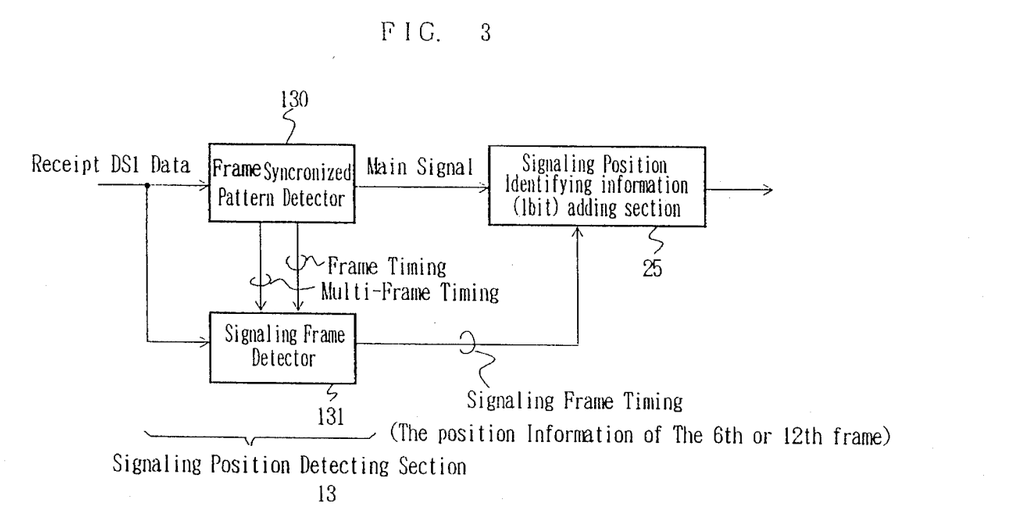
FIG. 3 is a diagram explaining the function of a signaling position detecting section and a signaling position identifying information adding section.
Figure 4:
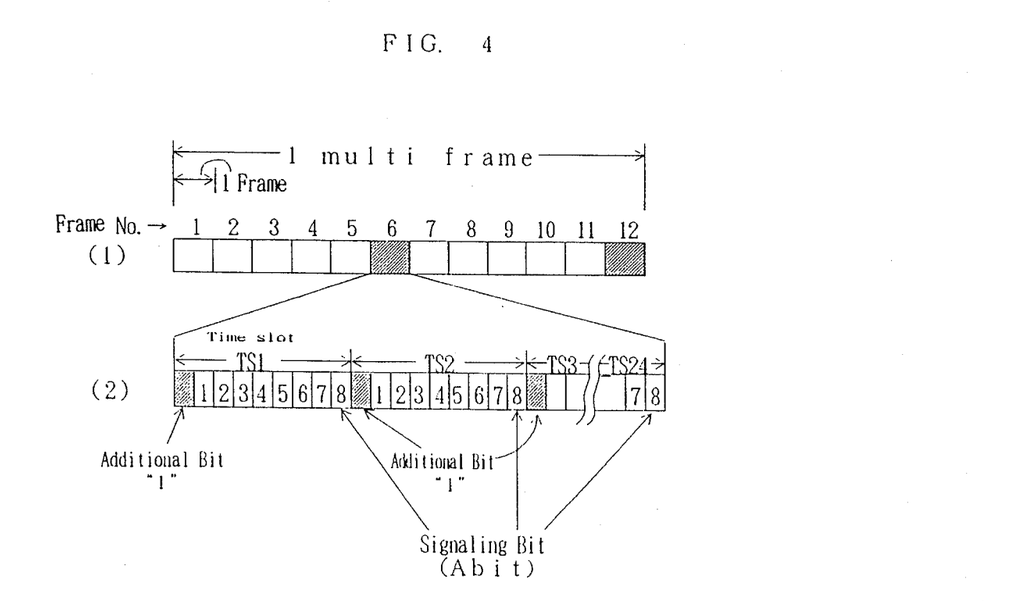
FIG. 4 shows a frame format according to the embodiment of the present invention corresponding to FIG. 2.

FIG. 3 is a diagram for explaining the function of the signaling position detecting section 13 and the signaling position identifying information adding section 25 shown in FIG. 2. FIG. 4 shows a frame format according to the embodiment of the present invention corresponding to FIG. 2.

The signaling position detecting section 13 is composed of a frame synchronized pattern detector 130 and a signaling frame detector 131. The timing of the multi-frame shown in (1) of FIG. 4 and the timing of each frame (No. 1 to No. 12) of the received receipt DS1 data including multi-frames are detected in the frame synchronized pattern detector 130 and sent to the signaling frame detector 131.

The information of the sixth and twelfth frame positions shown in (1) of FIG. 4 are sent to the signaling position information transmitting section 15.

The signaling position information transmitting section 15 is used as a signaling position identifying information adding section 25, as shown in FIG. 3. In the signaling position identification information adding section 25, 1 bit used as an additional bit is transmitted to the TSI circuit 10, as shown in (2) of FIG. 4. The additional bit is in the head of each time slot of the sixth frame.

A frame format according to the embodiment of the present invention will be now explained in detail. (2) of FIG. 4 shows a signal format in the sixth frame, having time slots TS1 to TS24 for 24 channels.

Each of time slots codes the voice frequency signal with 7 bit (1 to 7), and locates the signaling bit (A bit) on the position of LSB (8). Further, the additional bits are inserted between the adjacent time slots. A logic "1" is set on the positions of these additional bits as signaling position identifying information.

Although the additional bit is inserted to each time slot of the sixth frame in the signaling position identifying information adding section 25, the additional bit can be also inserted to each time slot of the twelfth frame, similarly.

In the case where the additional bits are inserted only to each time slot of the sixth frame, it is possible to detect the position of the twelfth frame by counting the time slots required for 6 frames with the counter and the like, on the basis of the sixth frame in which the additional bits are inserted, in the signaling information recognizing section 14.

Figure 5:
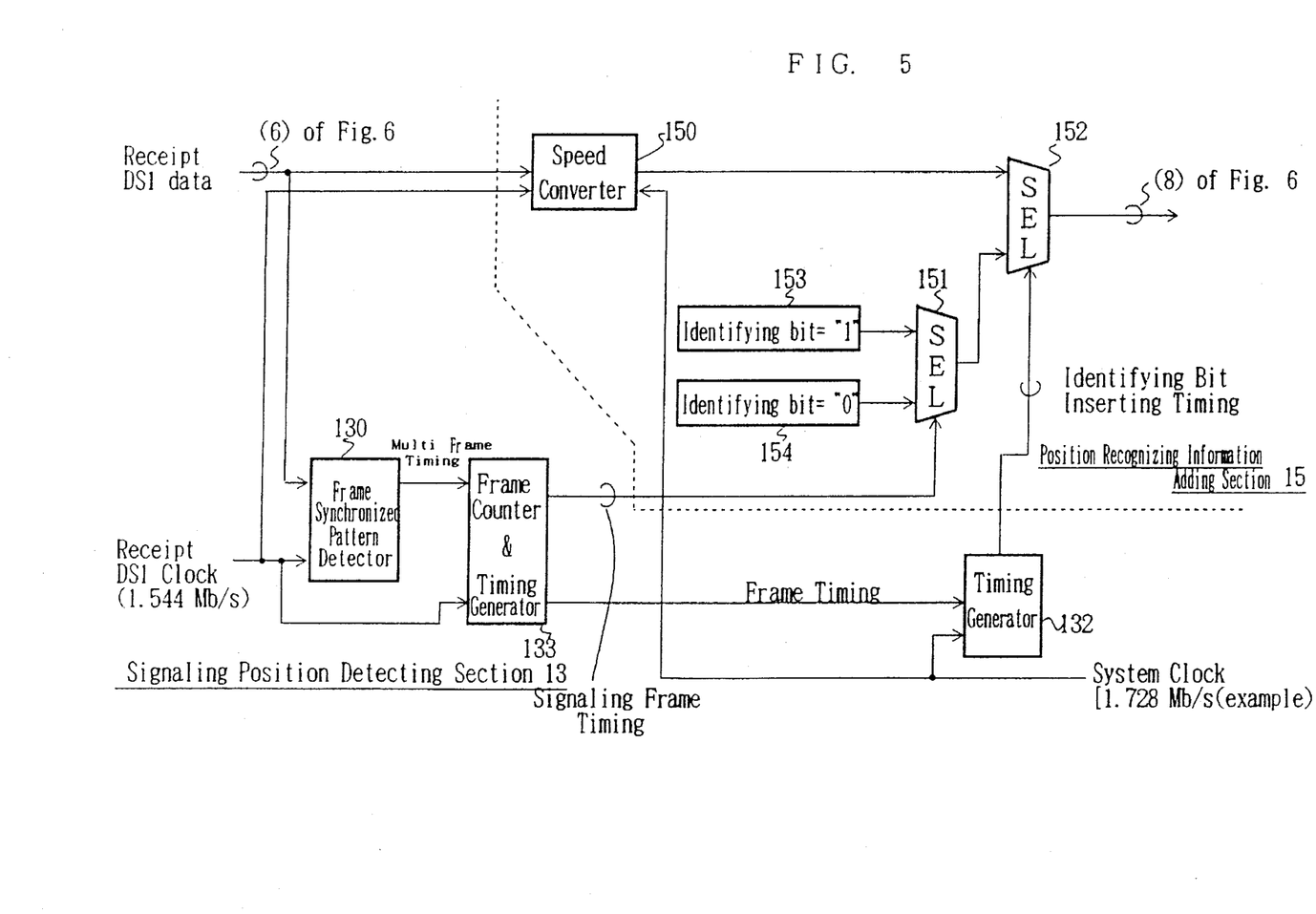
FIG. 5 is a block diagram showing the detailed structure of a signaling position detecting section and a signaling position identifying information adding section.
Figure 6:
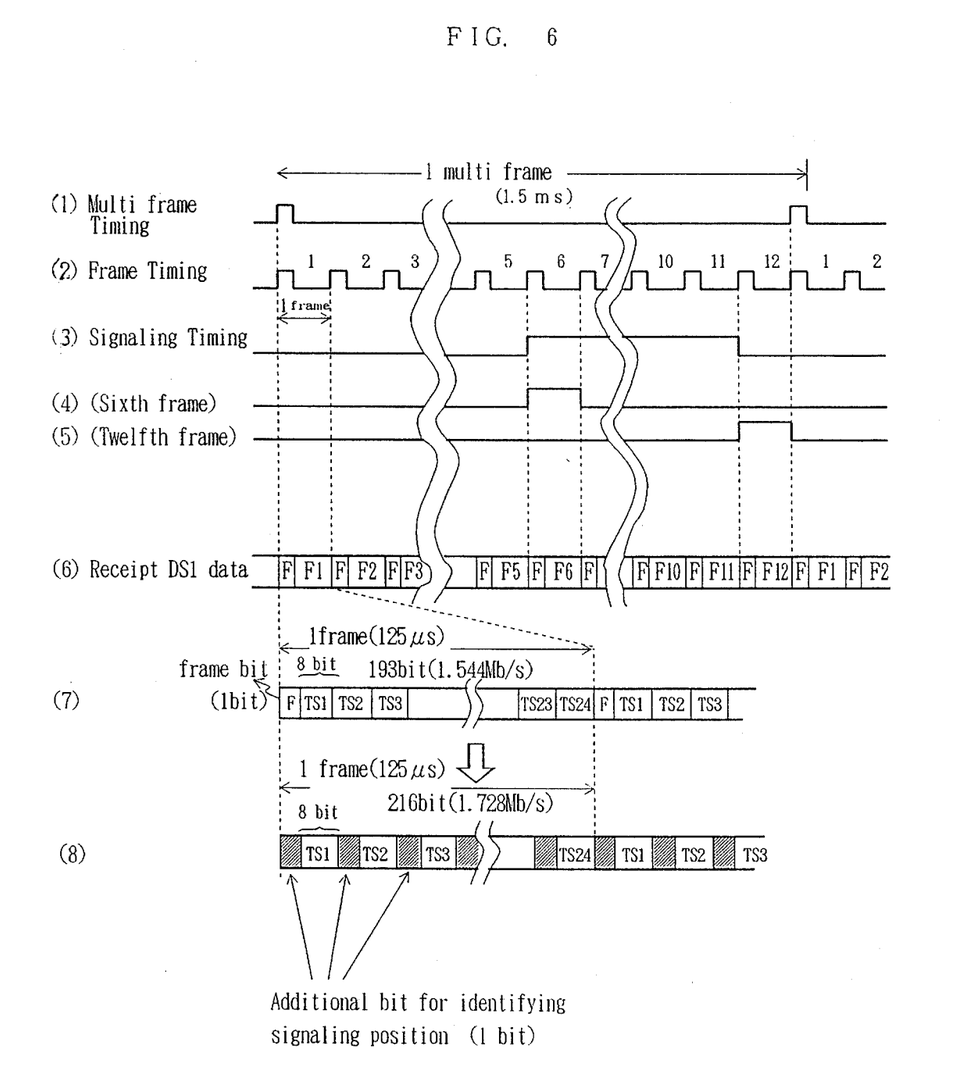
FIG. 6 illustrates an operating time chart corresponding to the embodiment shown in FIG. 5.

FIG. 5 is a block diagram showing the detailed structure of the signaling position detecting section 13 and the signaling position identifying information adding section 25. FIG. 6 shows an operating time chart of the embodiment shown in FIG. 5.

The received DS1 data and the DS1 clock shown in (6) of FIG. 6 are inputted to the frame synchronized pattern detector 130 of the signaling position detecting section 13. The DS1 clock is generated by synchronizing with the received DS1 data, in the circuit not shown in the diagram.

The received DS1 clock has the speed of 1,544 Mb/second, and the received DS1 data [(6) of FIG. 6] has 1.5 ms of one multi-frame period. The multi-frame timing signal shown in (1) of FIG. 6 is outputted on the basis of the received DS1 clock in the frame synchronized pattern detector 130.

Further, the signaling position detecting section 13 has a counter/timing generator 133 that receives the multi-frame timing signal from the frame synchronized pattern detector 130 and the DS1 clock transmitted, and outputs a frame timing signal shown in (2) of FIG. 6 and a signaling timing signal shown in (3) of FIG. 6, on the basis of the multi-frame timing signal and the DS1 clock.

The counter/timing generator 133 detects the positions of each frame, by counting the DS1 clock on the basis of the multi-frame timing signal. Further, the generator 133 can detect the positions of the sixth and the twelfth frames by counting the frames.

The frame timing signal is inputted to the timing generator 132. A system clock of which the frequency is synchronized with the DS1 clock (1,728 MHz in this embodiment) is inputted to the timing generator 132. The timing generator 132 outputs the inserted timing signal of the additional bit for identifying the signaling position [refer to (8) of FIG. 6].

The above-described signaling frame timing signal and the inserting timing signal of the additional bit for identifying the signaling position are inputted to the signaling position identifying information adding section 25. The signaling position identifying information adding section 25 has a speed converter 150, a first selector 151, a second selector 152, and generators 153 and 154 for generating identifying bits "1" and "0".

The speed convertor 150 converts the speed of the receipt DS1 data having the speed of 1.544 Mb/second to the signal having the speed of 1.728 Mb/second, based on the system clock of 1,728 MHz.

Accordingly, it becomes possible to locate 216 bits in the receipt DS1 data in which 193 bits are located in one frame (125 μS) by inserting additional bits per a location between the adjoined time slots.

The first selector 151 outputs on the rising timing and falling timing of the signaling frame timing [refer to (3) of FIG. 6], that is, the identifying bit "1" transmitted from the generator 153 is outputted in the case of the sixth and the twelfth frames, and the identifying bit "0" transmitted from the generator 154 is switched and outputted in other periods [refer to (4) and (5) of FIG. 6].

Further, the identifying bit "1" may be outputted only to the rising timing of the signaling frame timing transmitted from the first selector 151, that is, the case of the sixth frame.

The second selector 152, which is controlled to switch according to the inserting timing signal of the additional bits for identifying the signaling positions transmitted from the timing generator 132, outputs the identifying bit "1" or "0" transmitted from the first selector 151 at the timing of inserting the signal of the additional bit for identifying signaling position, and outputs the received DS1 data of which speed is converted at the other timing.

As is apparent from (8) of FIG. 6, the identifying bit "1" are inserted to the additional bits which are in the head of each time slot of the 24 time slots in the sixth frame. The identifying bits "0" are inserted in other frames.

Figure 7:
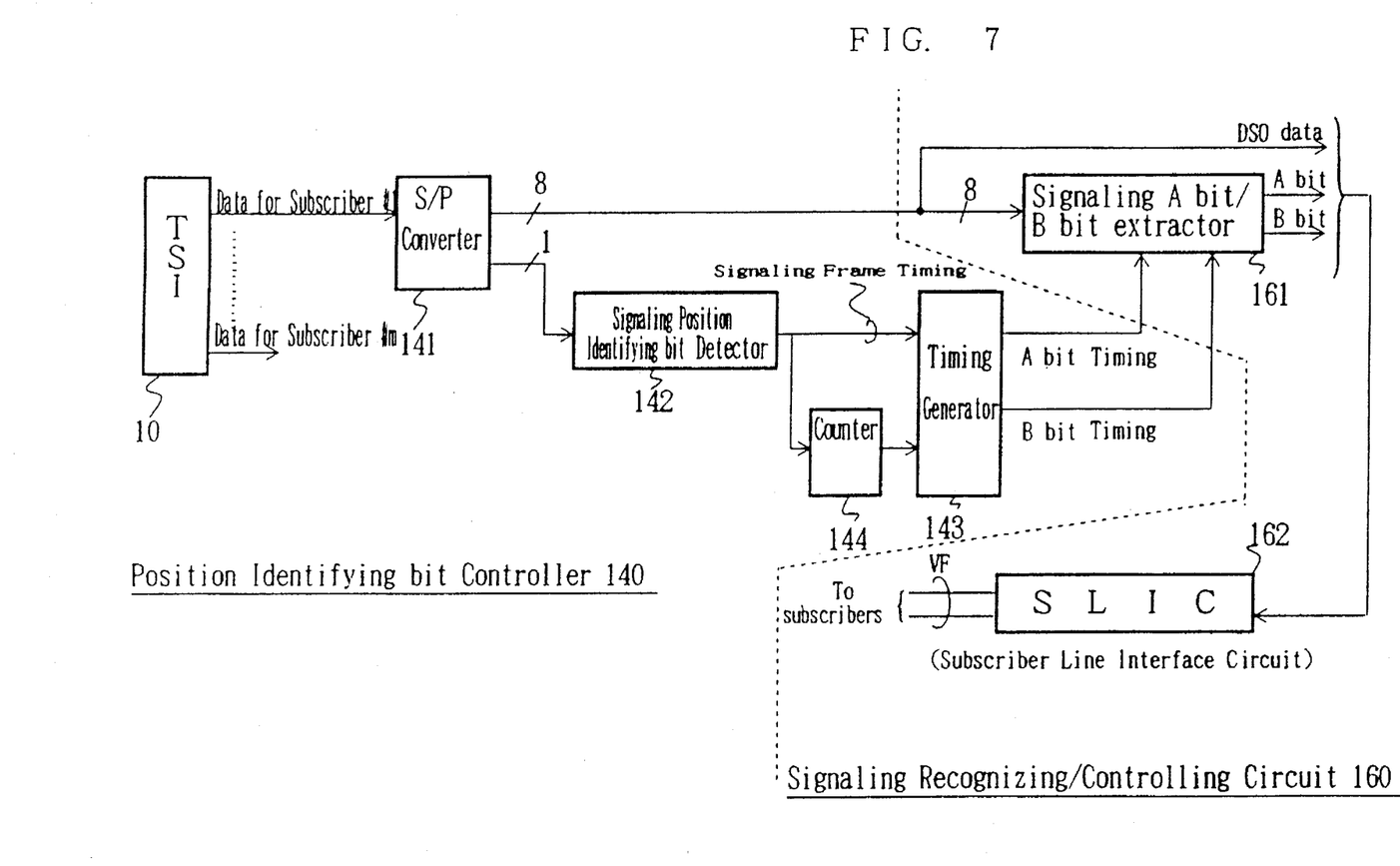
FIG. 7 is a block diagram showing the detailed structure of a position identifying bit controller and a signaling recognizing/controlling circuit.

FIG. 7 shows a detailed structure of a position identifying bit monitor 140 and a signaling recognizing/controlling circuit 160 in the latter section of TSI circuit 10. It shows only one subscriber line, as the concentrated lines of m subscribers are connected in the TSI circuit 10 with the same structure.

The positions of 24 channels in each frame are exchanged in the TSI circuit 10, and outputted as subscriber data. The subscriber data is a series signal, so that it is converted to the parallel signal per time slot in a series/parallel converter 141. The parallel signals having 9 bits are composed of one additional bit and 8 data bits.

The additional bits are led to a signaling position identifying detector 142. In the embodiment of FIG. 7, the signaling position identifying bits "1" are inserted to the positions of additional bits in only sixth frame.

That is, the signaling position identifying detector 142 detects the identifying bits "1" of the additional bits in the sixth frame, and inputs the detected output to a timing generator 143 and a counter 144. The counter 144 counts the predetermined value from the timing of detecting the identifying bit "1" of the additional bit in the sixth frame to the timing in the twelfth frame, and sends the timing signal to the timing generator 143 at the time of finishing counting.

The timing generator 143 outputs the timing signal of A bit in the sixth frame, when there is an output detected from the signaling position identifying detector 142. Similarly, the timing signal at the time of finishing counting is inputted from the counter, so that it outputs the timing signal of B bit in the twelfth frame.

On the other hand, the parallel signals of 8 bit outputted from the series/parallel converter 141 are sent to a subscriber line interface circuit 162. Further, the parallel signals of 8 bit are inputted to a signaling A bit/B bit extractor 161, and A bit and B bits which are in the position of LSB of the parallel signal of 8 bits are extracted by outputting the timings of A and B bits of the timing generator 143 and sent to the subscriber line interface circuit 162, similarly.

The subscriber line interface circuit 162 decodes A bit/B bit which indicate signaling information and controls the signaling of the subscriber terminal. At the same time, DS0 data is sent to the subscriber terminal.

Further, in the above-described embodiment, although an additional bit should be inserted to each time slot to detect the position of signaling information, the above embodiment does not limit the present invention. For example, it is also possible to insert by coding the position of signaling information, when the additional bit is made 2 bits.

As explained above, the present invention brings the effect of inserting the signaling information in A and B bits at the accurate position of a signaling frame. The position of the signaling frame can be recognized according to the additional bit.

Also, the present invention realizes that the signaling information can be recognized accurately, even after the time slots are cross-connected by the TSI circuit 10, so that no deterioration of the voice frequency signal characteristics occurs.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A subscriber group digital transmitter for cross-connecting time slots of DS1 data received by the transmitter, comprising:

first means for receiving the DS1 data and detecting, from the received DS1 data, positions of a signaling control signal for controlling and monitoring at least one subscriber connected to the transmitter;

a time slot interchange (TSI) circuit, operatively connected to said first means, for receiving DS1 data output from said first means and interchanging time slots of the DS1 data;

second means, coupled to said first means, for receiving therefrom the detected positions and outputting a position information signal indicating the detected positions of the signaling control signal; and third means, operatively connected to said TSI circuit and said second means, for recognizing the position information signal, inserting the signaling control signal into an output signal received from said TSI circuit according to the position information signal output from said second means, and outputting an obtained control signal to said at least one subscriber.

2. A transmitter according to claim 1, wherein the signaling control signal is inserted in time slots of the DS1 data output from said TSI circuit in correspondence with the position information signal.

3. A transmitter according to claim 1, wherein the received DS1 data is of a multi-framed signal, and wherein the first means counts clocks of the received multi-framed signal to detect each of frame positions of sixth and twelfth frames of said signal.

4. A subscriber group digital transmitter comprising:

a signaling position detecting section for receiving DS1 data transmitted via a plurality of DS1 lines and detecting time slots of signaling information for each of the DS1 lines;

a signaling position transmitting section, operatively connected to the signaling position detecting section, for receiving and transmitting the detected time slots of signaling information;

a time slot interchange circuit for receiving the DS1 data and cross-connecting time slots of the received DS1 data; and a signaling information recognizing section, operatively connected to the signaling position transmitting section and the time slot interchange circuit, for inserting signaling information to the time slots of the DS1 data, cross-connected in the time slot interchange circuit, in correspondence with signaling information transmitted from the signaling position information transmitting section.

5. A subscriber group digital transmitter comprising:

first means for receiving DS1 data transmitted via a plurality of DS1 lines and detecting time slots of signaling information for each of the DS1 lines;

second means, operatively connected to the first means, for outputting an information signal indicating specified time slots having the signaling information detected by the first means;

a time slot interchange circuit for receiving the DS1 data and cross-connecting time slots of the received DS1 data; and third means for receiving an output of the time slot interchange circuit and inserting the signaling information to the specified time slots indicated by the information signal output from the second means.

6. A transmitter according to claim 5, wherein the DS1 data is formed in a multi-frame, which includes N frames, each frame having time slots composed of P bits required for each DS1 line, and wherein additional bits are added respectively between adjoined time slots of M time slots, so that logic values of the additional bits of the ½Nth and Nth frames become different from a logic value of other frames as signaling position information; N, M and P being each an integer.

7. A transmitter according to claim 6, wherein N is 12, M is 24 and P is 8.

8. (amended) A transmitter according to claim 7, wherein the logic value of the additional bits in the sixth and twelfth frames is made "1" and the logic value in the other frames is made "0".

9. A transmitter according to claim 5, wherein the DS1 data is formed in a multi-frame, which includes twelve frames, each having 24 time slots composed of 8 bits required for each DS1 line, and wherein additional bits are added respectively between adjoined time slots of the 24 time slots, so that logic values of the additional bits of the sixth and twelfth frames become different from logic values of other frames as signaling position information, and wherein the third means detects a logic value of an additional bit in the sixth frame and further detects the twelfth frame by counting 6 frames from the detected sixth frame.

* * * * *